United States Patent
Ren et al.

(10) Patent No.: US 12,213,138 B2
(45) Date of Patent: Jan. 28, 2025

(54) PHYSICAL SIDELINK CHANNEL-BASED TRANSMISSION CONFIGURATION INFORMATION TRANSMITTING METHOD AND RECEIVING METHOD AND DEVICE

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 386 days.

(21) Appl. No.: 17/763,604

(22) PCT Filed: Aug. 19, 2020

(86) PCT No.: PCT/CN2020/109948
§ 371 (c)(1),
(2) Date: Mar. 24, 2022

(87) PCT Pub. No.: WO2021/057341
PCT Pub. Date: Apr. 1, 2021

(65) Prior Publication Data
US 2022/0346080 A1    Oct. 27, 2022

(30) Foreign Application Priority Data
Sep. 25, 2019  (CN) .......................... 201910910633.9

(51) Int. Cl.
*H04W 72/20* (2023.01)
*H04L 5/14* (2006.01)
(Continued)

(52) U.S. Cl.
CPC .......... *H04W 72/20* (2023.01); *H04L 5/1469* (2013.01); *H04W 56/001* (2013.01); *H04W 72/0446* (2013.01)

(58) Field of Classification Search
CPC .............. H04L 5/1469; H04W 56/001; H04W 72/0446; H04W 72/20
See application file for complete search history.

(56) References Cited

U.S. PATENT DOCUMENTS

2017/0273128 A1   9/2017  Abedini et al.
2018/0309513 A1  10/2018  Kim et al.
(Continued)

FOREIGN PATENT DOCUMENTS

CN   106304344 A    1/2017
CN   108834433 A   11/2018
(Continued)

OTHER PUBLICATIONS

First Office Action for the corresponding Korean Patent Application No. 10-2022-7013298 issued by the Korean Patent Office on Feb. 27, 2024 and its English translation provided by foreign associate.
(Continued)

*Primary Examiner* — Chi H Pham
*Assistant Examiner* — Eibin Huang
(74) *Attorney, Agent, or Firm* — Ladas & Parry, LLP

(57) ABSTRACT

The present disclosure provides an information transmitting method, an information receiving method, and a device. The information transmitting method is applied to user equipment, and includes: transmitting transmission configuration information through a physical sidelink channel; wherein the transmission configuration information includes first indication information, the first indication information is used for indicating that at least one slot is a downlink slot, a flexible slot or an uplink slot, and/or indicating that at least one
(Continued)

symbol is a downlink symbol, a flexible symbol or an uplink symbol; the physical sidelink channel includes at least one of a physical sidelink broadcast channel, a physical sidelink shared channel or a physical sidelink control channel.

18 Claims, 7 Drawing Sheets

(51) Int. Cl.
*H04W 56/00* (2009.01)
*H04W 72/0446* (2023.01)

(56) References Cited

U.S. PATENT DOCUMENTS

| | | | | |
|---|---|---|---|---|
| 2018/0367289 | A1* | 12/2018 | Kim | ............... H04L 5/0078 |
| 2019/0053227 | A1 | 2/2019 | Huang et al. | |
| 2019/0173612 | A1 | 6/2019 | Kimura et al. | |
| 2019/0174530 | A1 | 6/2019 | Kim et al. | |
| 2020/0015214 | A1* | 1/2020 | Si | ............... H04W 76/14 |
| 2020/0045697 | A1* | 2/2020 | Choi | ............ H04W 72/0446 |
| 2020/0045738 | A1* | 2/2020 | Oh | ............... H04W 72/0446 |
| 2020/0204407 | A1* | 6/2020 | Liu | ............... H04W 72/0453 |
| 2021/0185674 | A1* | 6/2021 | Zhao | ............ H04W 72/0446 |
| 2021/0385710 | A1* | 12/2021 | Jin | ............... H04W 48/12 |
| 2022/0173829 | A1* | 6/2022 | Huang | ............... H04L 1/0004 |

FOREIGN PATENT DOCUMENTS

| | | |
|---|---|---|
| CN | 109392160 A | 2/2019 |
| CN | 109565853 A | 4/2019 |
| CN | 109644174 A | 4/2019 |
| CN | 110169094 A | 8/2019 |
| WO | 2018145019 A1 | 8/2018 |
| WO | 2018195503 A1 | 10/2018 |

OTHER PUBLICATIONS

"Design of group-common PDCCH" 3GPP TSG RAN WG1 NR Meeting 90bis, R1-1717485, Prague, CZ, Oct. 9-13, 2017, Source: vivo, Agenda Item: 7.3.1.3, all pages.
"Frame and slot structure for sidelink" 3GPP TSG RAN WG1 Meeting #96, R1-1903069. Athens, Greece, Feb. 25-Mar. 1, 2019, Source: Huawei, HiSilicon, Agenda Item: 7.2.4.1.5, all pages.
"Mode 1 resource allocation for NR SL," 3GPP TSG RAN WG1 #98, R1-1908362, Prague, CZ, Aug. 26-30, 2019, Source: OPPO, Agenda Item: 7.2.4.2.1, all pages.
International Search Report for PCT Application PCT/CN2020/109948 issued on Nov. 27, 2020, and its English Translation provided by WIPO.
Written Opinion for PCT Application PCT/CN2020/109948 issued on Nov. 27, 2020, and its English Translation provided by WIPO.
Internationally Preliminary Report on Patentability for PCT/CN2020/109948 issued on Mar. 15, 2022 , and English translation provided by WIPO.
"Mode 1 resource allocation for NR SL," 3GPP TSG RAN WG1 #97, R1-1906473, Reno, USA, 13-17, 2019, Source: OPPO, Agenda Item: 7.2.4.2.1, all pages.
"Frame and slot structure for sidelink" 3GPP TSG RAN WG1 Meeting #97, R1-1906594, Reno, USA, May 13-17, 2019, Agenda Item: 7.2.4.8, Source: Huawei, HiSilicon, all pages.
First Office Action and search report for Chinese Patent Application 201910910633.9 issued on Jul. 16, 2021, and its English translation provided by Global Dossier.
NR V2X slot structure and configuration on a shared carrier 3GPP TSG RAN WG1 Meeting #95, R1-1813073, Spokane, USA, Nov. 12-16, 2018, Agenda Item: 7.2.4.3, Source: Spreadtrum Communications, all pages.
Sony, "Discussion on physical layer structure for NR sidelink," 3GPP TSG RAN WG1 #96bis, R1-1904255, Xi'an, China, Apr. 8-Apr. 12, 2019, all pages.
Second Office Action and search report for Chinese Patent Application 201910910633.9 issued on Mar. 16, 2022, and its English translation provided by Global Dossier.
"Sidelink Synchronization Mechanism for NR V2S," 3GPP TSG RAN WG1 #97, R1-1906208, Reno, USA, May 13-17, 2019, Source: NTT DOCOMO, Inc, all pages.
"Discussion of synchronization mechanism for NR-V2X," 3GPP TSG RAN WG1 #97, R1-1906474 Sync, Reno, USA, May 13-17, 2019, Source: OPPO , Agenda Item: 7.2.4.3, all pages.
First Office Action and search report for Taiwanese Patent Application 109129511 issued on May 17, 2021, and its English translation provided by Foreign Associate.
3GPP TS 38.213 V15.6.0 (Jun. 2019), 3rd Generation Partnership Project; Technical Specification Group Radio Access Network; NR; Physical layer procedures for control (Release 15), all pages.
The Extended European Search Report for European Patent Application 20869029.7, issued on Oct. 11, 2022.
"Discussion of Uu-based sidelink resource allocation and configuration," 3GPP TSG RAN WG1 #96, R1-1902388, Athens, Greece, Feb. 25-Mar. 1, 2019, Source: OPPO, Agenda Item: 7.2.4.3, all pages.
"Introduction of V2V into TS36.213," 3GPP TSG-RAN WG1 Meeting #86, R1-168226, Gothenburg, Sweden, Aug. 22-26, 2016, Source to WG: Motorola Mobility, all pages.

* cited by examiner transmitting transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel

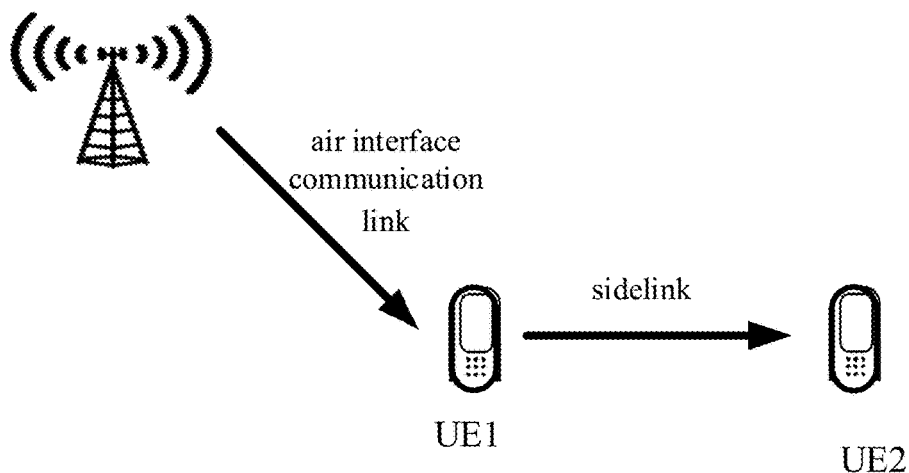

Fig. 2 receiving transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel

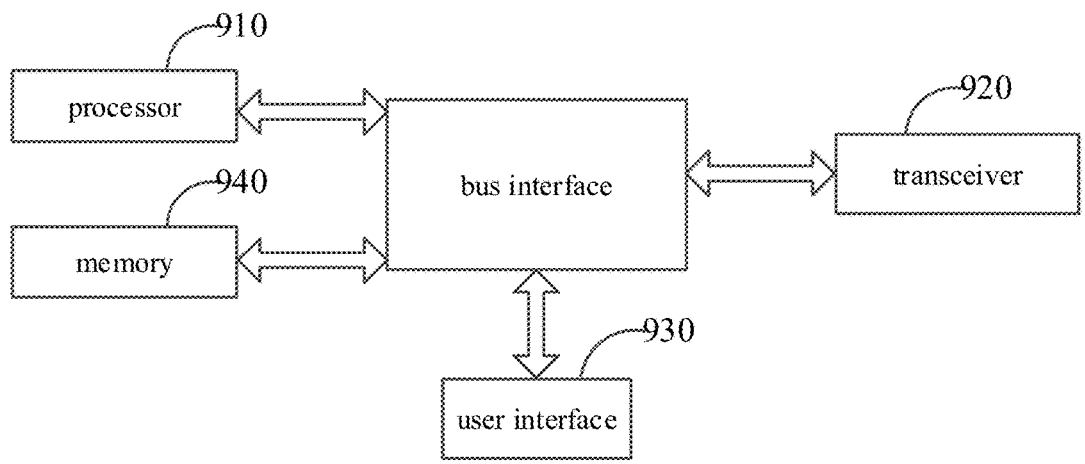

Fig. 9

PHYSICAL SIDELINK CHANNEL-BASED TRANSMISSION CONFIGURATION INFORMATION TRANSMITTING METHOD AND RECEIVING METHOD AND DEVICE

CROSS-REFERENCE TO RELATED APPLICATIONS

The present application is a U.S. national phase application of a PCT Application No. PCT/CN2020/109948 filed on Aug. 19, 2020, which claims a priority to the Chinese patent application No. 201910910633.9 filed in China on Sep. 25, 2019, the disclosures of which are incorporated herein by reference in their entireties.

TECHNICAL FIELD

The present disclosure relates to the field of communication technology, in particular to an information transmitting method, an information receiving method and a device.

BACKGROUND

In the fifth generation (5G) New Radio (NR) vehicle-to-everything (V2X) system, direct communication between terminals is performed using the PC5 interface (sidelink). Before service data transmission is performed, synchronization is first established at the PC5 interface (sidelink) between two communicating terminals. The method of establishing synchronization is that a terminal A sends a synchronization and broadcast signal, and the other terminal B receives the synchronization and broadcast signal from the terminal A. Once the terminal B receives and demodulates the signal successfully, the two terminals can establish synchronization and are ready for the next step of direct communication.

Synchronization information transmission performed on the NR V2X sidelink needs to use synchronization signal block (SSB), and the SSB on the sidelink is called S-SSB. SSB pattern includes sidelink primary synchronization signal (S-PSS), sidelink secondary synchronization signal (S-SSS), and physical sidelink broadcast channel (PSBCH). To reduce complexity, the S-SSB transmission may not utilize beam sweeping, but rather send an omnidirectional beam once or repeatedly send the same beam multiple times.

In a V2X system, to avoid interference from V2X UE (user equipment) to Uu UE (note: V2X communication refers to communication between UE and UE, and Uu communication refers to communication between a base station and UE), V2X UE can only transmit or receive sidelink data on an uplink carrier or in an uplink slot, i.e., every sidelink communication will occur on the uplink carrier or in the uplink slot. In NR, a slot format includes a downlink slot, a flexible slot, or an uplink slot, so the slot format information needs to be communicated to the V2X UE, so that the V2X UE can choose to perform sidelink communication in the uplink slot only.

However, in a V2X system, the UEs performing sidelink communication include UEs located inside the coverage of the base station and UEs located outside the coverage of the base station. The UEs inside the base station coverage can receive the slot format information transmitted by the base station and thus be informed of the location of the uplink slot. However, for the UEs outside the coverage, it is impossible to know the location of the uplink slot. Therefore if the UE outside the coverage transmits sidelink data in the downlink slot, the UE outside the coverage will cause serious interference to the downlink data of the Uu UE, thus leading to degradation of qualities of the sidelink communication and the air interface communication.

SUMMARY

The purpose of the present disclosure is to provide an information transmitting method, an information receiving method and a device, so as to solve the problem that sidelink data transmission of UEs outside the coverage of the base station on a downlink slot interferes with the downlink data of Uu UEs.

To achieve the foregoing purpose, an embodiment of the present disclosure provides an information transmitting method, applied to user equipment, including:
  transmitting transmission configuration information through a physical sidelink channel; wherein
  the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
  the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the transmitting the transmission configuration information through the physical sidelink channel includes: carrying the transmission configuration information in a payload of the physical sidelink broadcast channel or a demodulation reference signal of the physical sidelink broadcast channel.

Optionally, the physical sidelink channel includes at least a physical sidelink shared channel; the transmitting the transmission configuration information through the physical sidelink channel includes: carrying the transmission configuration information in a system message block or a radio resource control signalling of the physical sidelink shared channel.

Optionally, the physical sidelink channel includes at least a physical sidelink control channel; the transmitting the transmission configuration information through the physical sidelink channel includes: carrying the transmission configuration information in sidelink control information of the physical sidelink control channel.

Optionally, the first indication information is:
  time division duplex uplink-downlink pattern information used for communication between a base station and user equipment; or
  slot format indication information used for communication between the base station and the user equipment; or
  at least one of uplink slot related information, uplink symbol related information, flexible slot related information or flexible symbol related information in the time division duplex uplink-downlink pattern information used for communication between the base station and the user equipment; or
  at least one of uplink slot related information, uplink symbol related information, flexible slot related information or flexible symbol related information in the slot format indication information used for communication between the base station and the user equipment; or valid information in the time division duplex uplink-downlink pattern information used for communication between the base station and the user equipment or the slot format indication information used for communication between the base station and the user equipment after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:
a next slot of a synchronization slot where a current sidelink synchronization signal and broadcast signal block (S-SSB) is located; or
a first slot of a radio frame including the synchronization slot where the current S-SSB is located; or
a first slot of a radio frame including a synchronization slot where a first S-SSB of a current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the transmitting the transmission configuration information through the physical sidelink channel includes: after transmitting the transmission configuration information on the physical sidelink broadcast channel, periodically transmitting the transmission configuration information on the physical sidelink control channel.

Optionally, the transmission configuration information is obtained by the user equipment from the slot format indication information in a case that the base station configures all slots as flexible slots.

Optionally, the transmission configuration information is obtained from a single cell-specific time division duplex uplink-downlink pattern configured by the base station.

Optionally, the transmitting the transmission configuration information through the physical sidelink channel includes: transmitting, in a case that sidelink communication is performed using multiple carriers, the same transmission configuration information for the multiple carriers through the physical sidelink channel.

Optionally, the downlink slot refers to that all symbols in the entire slot are downlink symbols; the flexible slot refers to that all symbols in the entire slot are flexible symbols; the uplink slot refers to that all symbols in the entire slot are uplink symbols; the flexible symbol is a symbol that is not currently configured for uplink or downlink transmission.

To achieve the foregoing purpose, an embodiment of the present disclosure further provides an information receiving method, applied to user equipment, including:
receiving transmission configuration information through a physical sidelink channel; wherein
the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the receiving the transmission configuration information through the physical sidelink channel includes: receiving the transmission configuration information carried in a payload of the physical sidelink broadcast channel or a demodulation reference signal of the physical sidelink broadcast channel.

Optionally, the physical sidelink channel includes at least a physical sidelink shared channel; the receiving the transmission configuration information through the physical sidelink channel includes: receiving the transmission configuration information carried in a system message block or a radio resource control signalling of the physical sidelink shared channel.

Optionally, the physical sidelink channel includes at least a physical sidelink control channel; the receiving the transmission configuration information through the physical sidelink channel includes: receiving the transmission configuration information carried in sidelink control information of the physical sidelink control channel.

Optionally, the first indication information is:
time division duplex uplink-downlink pattern information used for communication between a base station and user equipment; or
slot format indication information used for communication between the base station and the user equipment; or
at least one of uplink slot related information, uplink symbol related information, flexible slot related information or flexible symbol related information in the time division duplex uplink-downlink pattern information used for communication between the base station and the user equipment; or
at least one of uplink slot related information, uplink symbol related information, flexible slot related information or flexible symbol related information in the slot format indication information used for communication between the base station and the user equipment; or
valid information in the time division duplex uplink-downlink pattern information used for communication between the base station and the user equipment or the slot format indication information used for communication between the base station and the user equipment after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:
a next slot of a synchronization slot where a current sidelink synchronization signal and broadcast signal block S-SSB are located; or
a first slot of a radio frame including the synchronization slot where the current S-SSB is located; or
a first slot of a radio frame including a synchronization slot where a first S-SSB of a current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the receiving the transmission configuration information through the physical sidelink channel includes: receiving the transmission configuration information transmitted periodically on the physical sidelink control channel, after receiving the transmission configuration information on the physical sidelink broadcast channel.

Optionally, the transmission configuration information is obtained by the user equipment from the slot format indication in a case that the base station configures all slots as flexible slots.

Optionally, the transmission configuration information is obtained from a single cell-specific time division duplex uplink-downlink pattern configured by the base station.

Optionally, the receiving the transmission configuration information through the physical sidelink channel includes: receiving, in a case that sidelink communication is performed using multiple carriers, the same transmission configuration information for the multiple carriers transmitted through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

To achieve the foregoing purpose, an embodiment of the present disclosure further provides user equipment including a transceiver, a memory, a processor and a computer program stored in the memory and configured to be executed by the processor; wherein,
the transceiver is configured to transmit transmission configuration information through a physical sidelink channel; wherein
the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the transceiver is further configured to: carry the transmission configuration information in a payload of the physical sidelink broadcast channel or a demodulation reference signal of the physical sidelink broadcast channel.

Optionally, the physical sidelink channel includes at least a physical sidelink shared channel; the transceiver is further configured to: carry the transmission configuration information in a system message block or a radio resource control signalling of the physical sidelink shared channel.

Optionally, the physical sidelink channel includes at least a physical sidelink control channel; the transceiver is further configured to: carry the transmission configuration information in sidelink control information of the physical sidelink control channel.

To achieve the foregoing purpose, an embodiment of the present disclosure further provides user equipment including a transceiver, a memory, a processor and a computer program stored in the memory and configured to be executed by the processor; wherein,
the transceiver is configured to receive transmission configuration information through a physical sidelink channel; wherein
the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the transceiver is further configured to: receive the transmission configuration information carried in a payload of the physical sidelink broadcast channel or a demodulation reference signal of the physical sidelink broadcast channel.

Optionally, the physical sidelink channel includes at least a physical sidelink shared channel; the transceiver is further configured to: receive the transmission configuration information carried in a system message block or a radio resource control signalling of the physical sidelink shared channel.

Optionally, the physical sidelink channel includes at least a physical sidelink control channel; the transceiver is further configured to: receive the transmission configuration information carried in sidelink control information of the physical sidelink control channel.

To achieve the foregoing purpose, an embodiment of the present disclosure further provides an information transmitting apparatus, applied to user equipment, including:
a transmitting module, configured to transmit transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

To achieve the foregoing purpose, an embodiment of the present disclosure further provides an information receiving apparatus, applied to user equipment, including:

a receiving module, configured to receive transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

To achieve the foregoing purpose, an embodiment of the present disclosure further provides a computer-readable storage medium storing thereon a computer program, wherein, the computer program is configured to be executed by a processor to implement the steps of the information transmitting method applied to user equipment as described above or the steps of the information receiving method applied to user equipment as described above.

The beneficial effect of the above technical solution of the present disclosure is as follows.

In the methods of the embodiments of the present disclosure, the user equipment transmits the transmission configuration information it has learned through at least one of the physical sidelink broadcast channel, the physical sidelink shared channel, or the physical sidelink control channel, so that the user equipment at the opposite end of the sidelink receives the transmission configuration information, thus if the user equipment at the opposite end is not in the coverage area of the base station, it is still able to be informed of the transmission configuration information and identify the uplink slot or symbol according to the first indication information in the transmission configuration, avoiding transmitting the sidelink data on the downlink slot or symbol and thus not interfering with the downlink data of the Uu UE, improving the qualities of the sidelink communication and the air interface communication.

BRIEF DESCRIPTION OF THE DRAWINGS

FIG. 1 is a flowchart of an information transmitting method according to an embodiment of the present disclosure;

FIG. 2 is a schematic diagram of an application scenario of an embodiment of the present disclosure;

FIG. 8 is a flowchart of an information receiving method according to an embodiment of the present disclosure;

FIG. 9 is a schematic structural diagram of user equipment according to an embodiment of the present disclosure;

DETAILED DESCRIPTION

Figure 3:
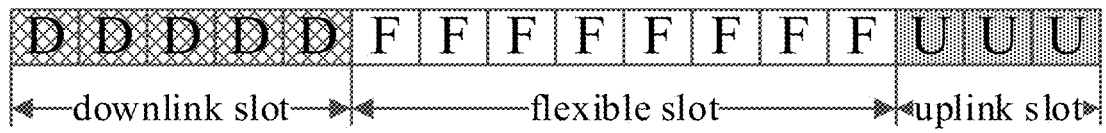
FIG. 3 is a schematic diagram of a transmission format pattern.

In order to make the technical problem to be solved, the technical solutions and advantages of the present disclosure clearer, the present disclosure will be described in detail below with reference to the drawings and specific embodiments.

As shown in FIG. 1, an embodiment of the present disclosure provides an information transmitting method, which is applied to user equipment and includes step 101.

Step 101, transmitting transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

In step 101, the user equipment transmits the transmission configuration information it has learned through at least one of the physical sidelink broadcast channel (PSBCH), the physical sidelink shared channel (PSSCH), and the physical sidelink control channel (PSCCH), so that the user equipment at the opposite end of the sidelink receives the transmission configuration information, thus if the user equipment at the opposite end is not in the coverage area of the base station, it is also able to be informed of the transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

As shown in FIG. 2, user equipment 1 (UE1) and user equipment 2 (UE2) carry out sidelink communication, wherein the UE1 is located within the coverage area of the base station and the UE2 is located outside the coverage area of the base station. In this way, UE1 receives transmission configuration of slots or symbols from the base station, and may learn specific transmission configuration information, including at least one of configuration information of uplink slots, configuration information of flexible slots, configuration information of downlink slots, configuration information of uplink symbols, configuration information of flexible symbols or configuration information of downlink symbols; and then, UE1 transmits the transmission configuration information through at least one of PSBCH, PSSCH or PSCCH to UE2, such that UE2 is able to be informed of the base station's transmission configuration of slots or symbols through UE1 even if UE2 cannot receive the information from the base station, thereby avoiding transmitting sidelink data on the downlink slot or symbol.

It should be understood that in this embodiment, the downlink slot refers to that all symbols in the entire slot are downlink symbols; the flexible slot refers to that all symbols in the entire slot are flexible symbols; the uplink slot refers to that all symbols in the entire slot are uplink symbols; the flexible symbol is a symbol that is not currently configured for uplink or downlink transmission.

The flexible symbol may subsequently be configured, by other signalling, for uplink or downlink transmission, or may not be configured for uplink or downlink transmission.

Optionally, the first indication information is a transmission format pattern of at least one slot or symbol; or an identifier corresponding to the transmission format pattern of at least one slot or symbol.

Here, the first indication information may be a transmission format pattern of at least one slot or symbol, thereby directly indicating the specific format of one or more slots or symbols. For example, it is predetermined that the downlink slots are concentrated at the front end of all the slots and all the uplink slots are concentrated at the back end of all the slots. For 16 slots whose format is to be indicated, the quantity of downlink slots requires 4 bits of information to indicate since it is possible that all the 16 slots are downlink slots, and similarly, the quantity of uplink slots also requires 4 bits of information to indicate, and the remaining slots located between the downlink slots and the uplink slots are flexible slots, so a total of 8 bits are needed to indicate the specific format of these 16 slots, so the information indicating the specific format of the 16 slots as shown in FIG. 3 is "01000010".

Of course, the corresponding relationship between the transmission format patterns and the identifiers may be preset, and the corresponding relationship between the identifiers (e.g., the index) and the transmission format patterns is configured in the user equipment, such that the first indication information may be an identifier corresponding to the transmission format pattern of at least one slot or symbol, reducing signalling overhead. The user equipment receives the identifier and can then find the corresponding transmission format pattern of at least one time slot or symbol. For example, a corresponding relationship between transmission format patterns of 16 slots and identifiers is shown in Table 1 below:

TABLE 1

| Identifier | Transmission format pattern of 16 slots corresponding to each identifier | | | | | | | | | | | | | | | |
| --- | --- | --- | --- | --- | --- | --- | --- | --- | --- | --- | --- | --- | --- | --- | --- | --- |
| 00 | D | D | D | F | F | U | U | U | D | D | D | F | F | U | U | U |
| 01 | D | D | F | F | U | U | U | U | D | D | F | F | U | U | U | U |
| 10 | D | F | U | U | U | U | U | U | D | F | U | U | U | U | U | U |
| 11 | D | D | D | D | D | F | U | U | D | D | D | D | D | F | U | U |

When the first indication information transmitted by the UE is "00", the opposite-end UE can determine after receiving the first indication information that the transmission format pattern of the 16 slots is the transmission format pattern corresponding to the identifier "00".

Optionally, the first indication information is:
  time division duplex uplink-downlink pattern information used for communication between the base station and the user equipment; or
  slot format indication information used for communication between the base station and the user equipment; or at least one of uplink slot related information, uplink symbol related information, flexible slot related information or flexible symbol related information in the time division duplex uplink-downlink pattern information used for communication between the base station and the user equipment; or at least one of uplink slot related information, uplink symbol related information, flexible slot related information or flexible symbol related information in the slot format indication information used for communication between the base station and the user equipment; or the valid information after removing redundant information from the time division duplex uplink-downlink pattern information used for communication between the base station and the user equipment or the slot format indication information used for communication between the base station and the user equipment.

Here, the user equipment may use the time division duplex uplink-downlink pattern (TDD UL-DL Pattern) information used for communication between the base station and the user equipment as the first indication information; or, use the slot format indication (SFI) used for communication between the base station and the user equipment as the first indication information; or, use at least one of uplink slot related information, uplink symbol related information, flexible slot related information or flexible symbol related information in the slot format indication information used for communication between the base station and the user equipment as the first indication information; or, use the valid information in the TDD UL-DL Pattern information or the slot format indication information used for communication between the base station and the user equipment after removing redundant information from the TDD UL-DL Pattern information or the slot format indication information used for communication between the base station and the user equipment as the first indication information.

The uplink slot related information is information for configuring at least one slot as an uplink slot; the uplink symbol related information is information for configuring at least one slot as an uplink symbol; the flexible slot related information is information for configuring at least one slot as a flexible slot; and the flexible symbol related information is information for configuring at least one slot as a flexible symbol. The valid information obtained by removing redundant information from the TDD UL-DL Pattern information or the SFI more concisely indicates the usage status of at least one slot or symbol, saving transmission resources.

Optionally, the first indication information includes 7 bits of uplink slot indication information.

Here, the first indication information may include only 7 bits of uplink slot indication information, i.e., the first indication information is composed of 7 bits. Of course, the first indication information may also include other indication information in addition to the uplink slot indication information.

Optionally, the first indication information further includes 4 bits of uplink symbol indication information.

Here, the first indication information includes 7 bits of uplink slot indication information as well as 4 bits of uplink symbol indication information, i.e., the first indication information includes 11 bits. Of course, the first indication information is not limited to including such 7 bits of uplink slot indication information and 4 bits of uplink symbol indication information, but may also include other indication information, which will not be described herein.

It should also be understood that in the embodiment, the user equipment transmits the transmission configuration information to the user equipment at the opposite end through at least one of PSBCH, PSSCH or PSCCH.

Optionally, the physical sidelink channel includes at least a physical sidelink broadcast channel; the transmitting the transmission configuration information through the physical sidelink channel includes: carrying the transmission configuration information in a payload of the physical sidelink broadcast channel or a demodulation reference signal of the physical sidelink broadcast channel.

In this way, the UE transmits the sidelink synchronization signal block (S-SSB), which includes the sidelink primary synchronization signal (S-PSS), sidelink secondary synchronization signal (S-SSS) and PSBCH, wherein the PSBCH carries the transmission configuration information, specifically the PSBCH payload or the PSBCH DMRS (demodulation reference signal) carries the transmission configuration information, ensuring high reliability and low latency of transmission configuration information delivery.

Figure 4:
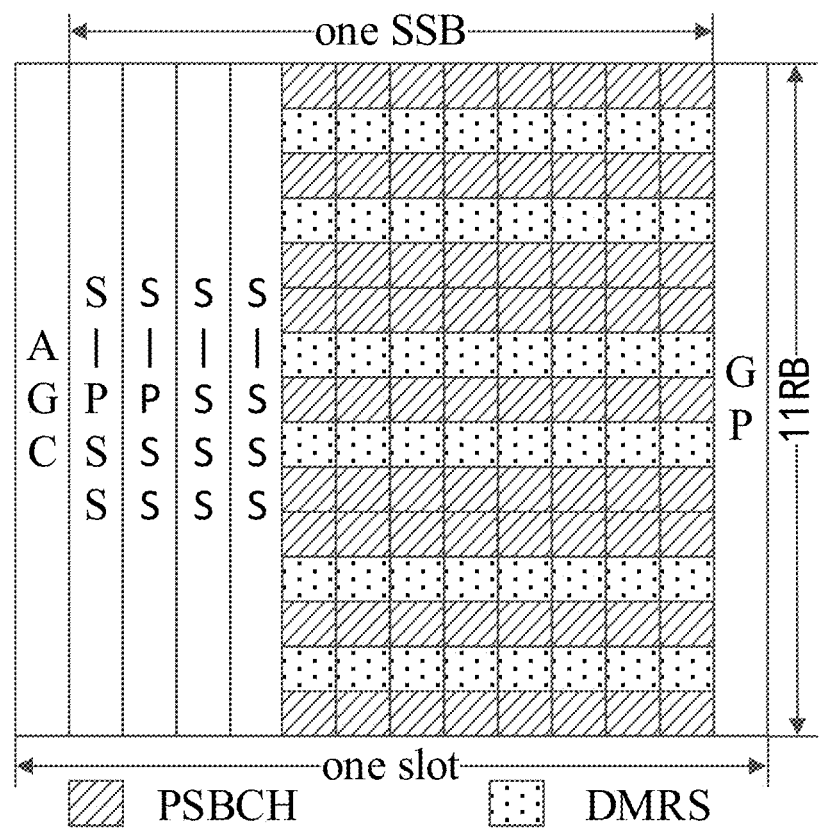
FIG. 4 is a schematic structural diagram of a slot.

For example, if the transmission configuration information occupies 14 bits and the PSBCH payload in a slot as shown in FIG. 4 can hold 56 bits, then the 14-bit transmission configuration information can be carried in the 56-bit PSBCH payload; if the transmission configuration information occupies 3 bits and the PSBCH DMRS in the slot as shown in FIG. 4 can hold 3 bits, then the 3-bit transmission configuration information can be carried in the PSBCH DMRS. In FIG. 4, the slot also includes automatic gain control (AGC), guard period (GP), S-PSS, and S-SSS.

The PSSCH primarily carries data of communication between V2X UEs, a sidelink system information block (SIB), and a sidelink radio resource control (RRC) signalling. Therefore, in the embodiment, optionally, the physical sidelink channel includes at least a physical sidelink shared channel; the transmitting the transmission configuration information through the physical sidelink channel includes: carrying the transmission configuration information in a system message block or a radio resource control signalling of the physical sidelink shared channel.

Figure 5:
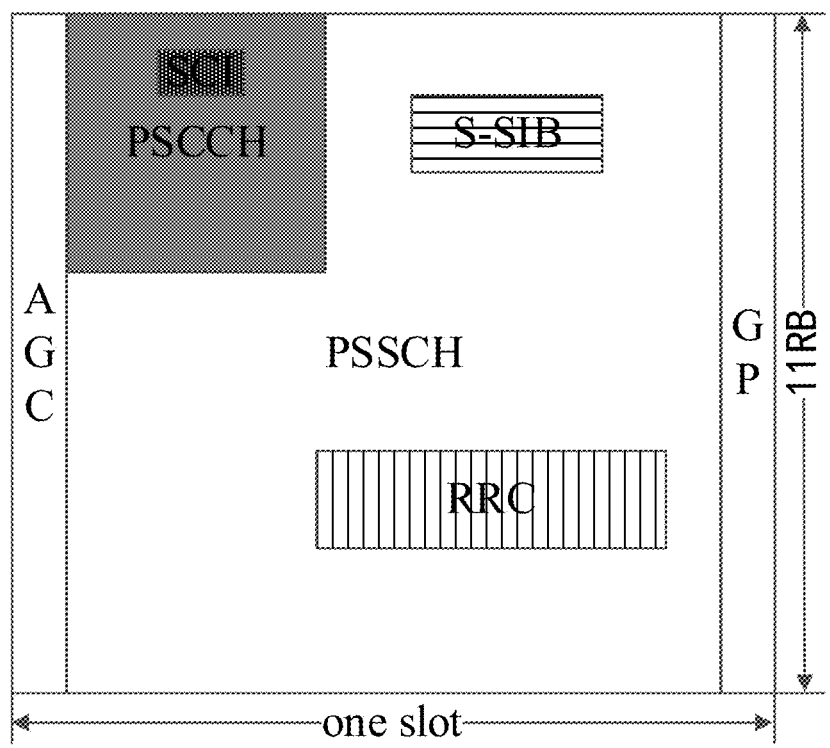
FIG. 5 is another schematic structural diagram of a slot.

Here, the transmission configuration information is carried by the PSSCH, specifically in the SIB or RRC of the PSSCH, as shown in FIG. 5.

In addition, the PSCCH primarily carries control information of communication between V2X UEs, including sidelink control information (SCI) etc. Therefore, optionally, the physical sidelink channel includes at least a physical sidelink control channel; the transmitting the transmission configuration information through the physical sidelink channel includes: carrying the transmission configuration information in sidelink control information of the physical sidelink control channel.

Figure 6:
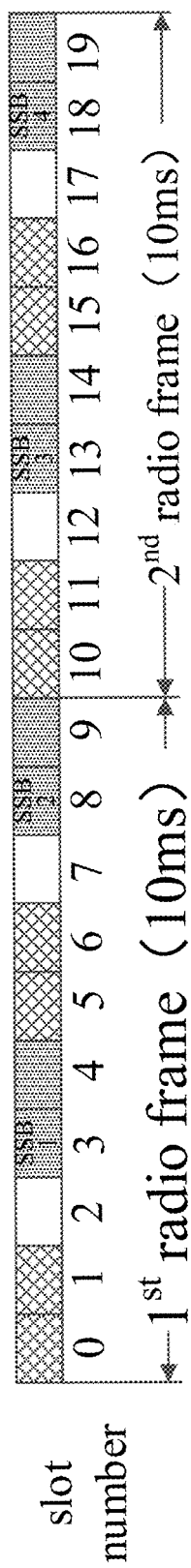
FIG. 6 is a schematic structural diagram of two radio frames.

Here, the transmission configuration information is carried by the PSCCH, specifically in the SCI of the PSCCH, as shown in FIG. 6.

In this embodiment, the use of a PSSCH or PSCCH to carry the transmission configuration information enables carrying a larger amount of data and reduces the pressure on the capacity of the PSBCH, allowing more space of the PSBCH to be allocated for carrying other information.

For the user equipment at the opposite end of the sidelink, after receiving the first indication information, it is also necessary to know a valid time of the slot format configured in this first indication information, so that the user equipment is informed by the slot format information of which slots and which symbols are uplink. Therefore, optionally, the transmission configuration information further includes second indication information indicating a valid time of the first indication information.

Optionally, the second indication information is:
the next slot of the synchronization slot where the current sidelink synchronization signal and broadcast signal block (S-SSB) is located; or
the first slot of the radio frame including the synchronization slot where the current S-SSB is located; or
the first slot of the radio frame including the synchronization slot where the first S-SSB of the current synchronization period is located.

As shown in FIG. 6, in NR, one radio frame lasts 10 ms fixedly, and each radio frame includes 10 subframes, each of which lasts 1 ms fixedly. For the subcarrier spacing of 15 KHz, the duration of each slot is 1 ms. Therefore, for the subcarrier spacing of 15 KHz, one radio frame includes 10 slots. The SSBs are transmitted in the 3rd, 8th, 13th and 18th slots. The first S-SSB is transmitted in the 3rd slot, the second S-SSB is transmitted in the 8th slot, the third S-SSB is transmitted in the 13th slot, and the fourth S-SSB is transmitted in the 18th slot. If the currently received S-SSB is the third S-SSB, it is the S-SSB transmitted in the 13th slot, and one synchronization period is 160 ms.

If the second indication information indicates the next slot of the synchronous slot where the current S-SSB is located, a valid time is the 14th slot; if the second indication information indicates the first slot of the radio frame including the synchronous slot where the current S-SSB is located, a valid time is the 10th slot; if the second indication information indicates the first slot of the radio frame including the synchronous slot where the first S-SSB of the current synchronization period is located, then a valid time is the 0th slot. In this way, this second indication information is simpler and more intuitive, of course, it may also be implemented with a complex mapping, which is not repeated here.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Here, the transmission configuration information remains unchanged in one synchronization period; or, in the transmission configuration information, only at least one piece of configuration information among configuration information configuring at least one slot as an uplink slot, configuration information configuring at least one slot as a flexible slot, configuration information configuring at least one symbol as an uplink symbol, or configuration information configuring at least one symbol as a flexible symbol remains unchanged in one synchronization period.

Optionally, the transmission configuration information carried in the sidelink control information is dynamically changing information.

In this way, the transmission configuration information carried by the SCI of the PSCCH is dynamically changing information that dynamically indicates the changes of the slot format.

Optionally, in this embodiment, the transmitting the transmission configuration information through the physical sidelink channel includes: periodically transmitting the transmission configuration information on the physical sidelink control channel, after transmitting the transmission configuration information on the physical sidelink broadcast channel.

Here, after the transmission configuration information is transmitted once on the PSBCH, the transmission configuration information can be further transmitted periodically on the PSCCH.

Optionally, the transmission configuration information is obtained by the user equipment from the slot format indication information in a case that the base station configures all slots as flexible slots.

Here, the base station configures all the slots as flexible slots through semi-static configuration signalling, and then the base station configures the flexible slots as downlink slots or uplink slots through SFI, wherein SFI can only configure the flexible slots as downlink slots or uplink slots, and cannot modify the slot format which has been configured as downlink or uplink slots through semi-static configuration signalling. Therefore, the UE can be informed, by the SFI received from the base station, of which flexible slots have been configured as uplink slots, and then transmits the transmission configuration information to the UE at the opposite end. Of course, the UE can directly forward the received SFI as transmission configuration information to the opposite-end UE.

Optionally, the transmission configuration information is obtained from a single cell-specific time division duplex uplink-downlink pattern configured by the base station.

Here, to reduce the transmission overhead, the base station will configure just one set of cell-specific time division duplex uplink-downlink pattern (cell-specific TDD UL-DL Pattern), so that the transmission configuration information can be obtained from the cell-specific TDD UL-DL Pattern.

Further, when the V2X UE is configured with multiple carriers for sidelink communication, if different slot formats are configured for two carriers, it is necessary to transmit the transmission configuration information about both carriers, which will introduce an increase in signalling overhead and may cause the PSBCH to be unable to carry the transmission configuration information. Therefore, optionally, the transmitting the transmission configuration information through the physical direct link channel includes: transmitting, in the case that sidelink communication is performed on multiple carriers, the same transmission configuration information for the multiple carriers through the physical sidelink channel.

Figure 7:
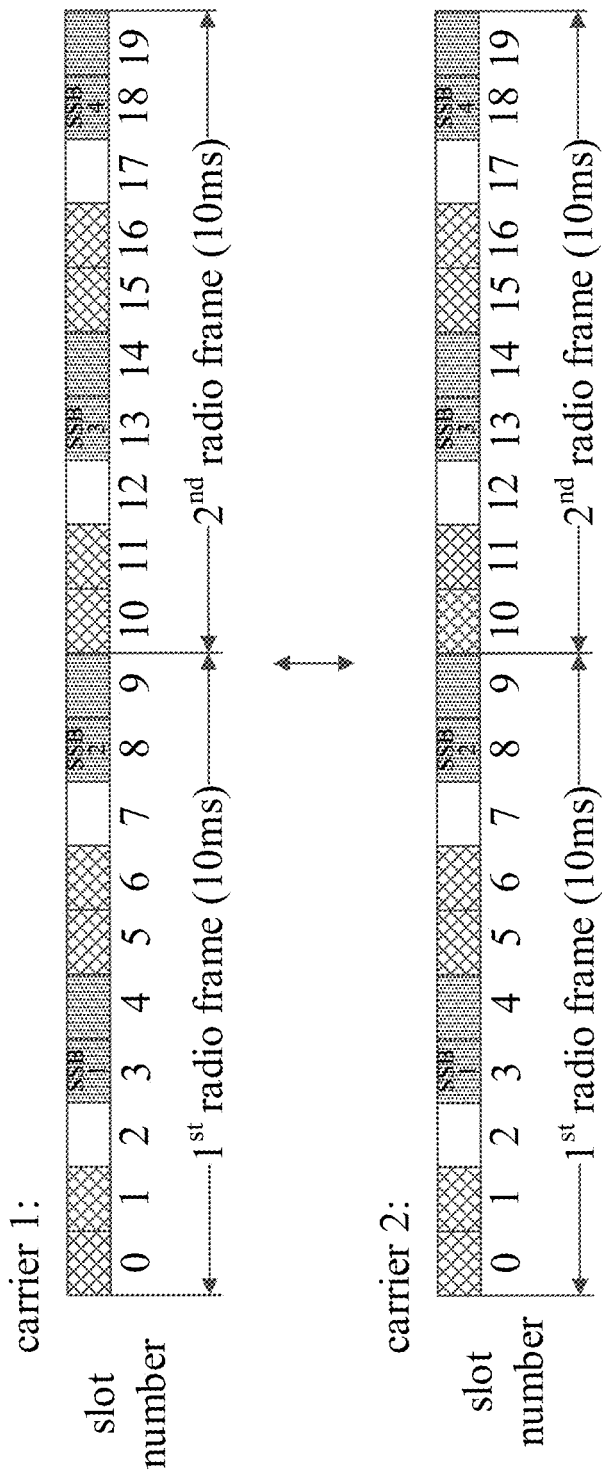
FIG. 7 is a schematic diagram of transmission format patterns for different carriers.

In this way, in the case that sidelink communication is performed on multiple carriers, the multiple carriers use the same transmission configuration information or are configured with the same transmission configuration information. As shown in FIG. 7, carrier 1 and carrier 2 have the same slot format, which reduces the transmission overhead of the transmission configuration information.

In summary, in the method of the embodiment of the present disclosure, the user equipment transmits the transmission configuration information it has learned through at least one channel of PSBCH, PSSCH or PSCCH, so that the user equipment at the opposite end of the sidelink can receive the transmission configuration information, thus if the user equipment at the opposite end is not in the coverage area of the base station, it is also able to be informed of the transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

As shown in FIG. 8, an embodiment of the present disclosure also provides an information receiving method, which is applied to user equipment and includes step 801.

Step 801, receiving transmission configuration information through a physical sidelink channel; wherein
  the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
  the physical sidelink channel includes at least one of a physical sidelink broadcast channel, a physical sidelink shared channel or a physical sidelink control channel.

The user equipment receives the transmission configuration information transmitted by the user equipment at the opposite end through at least one channel of PSBCH, PSSCH or PSCCH, thus if this user equipment is not in the coverage area of the base station, it is also able to be informed of this transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the receiving the transmission configuration information through the physical sidelink channel includes: receiving the transmission configuration information carried in a payload of the physical sidelink broadcast channel or a demodulation reference signal of the physical sidelink broadcast channel.

Optionally, the physical sidelink channel includes at least a physical sidelink shared channel; the receiving the transmission configuration information through the physical sidelink channel includes: receiving the transmission configuration information carried in a system message block or a radio resource control signalling of the physical sidelink shared channel.

Optionally, the physical sidelink channel includes at least a physical sidelink control channel; the receiving the transmission configuration information through the physical sidelink channel includes: receiving the transmission configuration information carried in sidelink control information of the physical sidelink control channel.

Optionally, the first indication information is:
  the time division duplex uplink-downlink pattern information used for communication between a base station and user equipment; or
  the slot format indication information used for communication between the base station and the user equipment; or at least one of uplink slot related information, uplink symbol related information, flexible slot related information or flexible symbol related information in the time division duplex uplink-downlink pattern information used for communication between the base station and the user equipment; or at least one of uplink slot related information, uplink symbol related information, flexible slot related information or flexible symbol related information in the slot format indication information used for communication between the base station and the user equipment; or the valid information in the time division duplex uplink-downlink pattern information used for communication between the base station and the user equipment or the slot format indication information used for communication between the base station and the user equipment after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:
the next slot of a synchronization slot where the current sidelink synchronization signal and broadcast signal block (S-SSB) is located; or
the first slot of the radio frame including the synchronization slot where the current S-SSB is located; or
the first slot of a radio frame including the synchronization slot where the first S-SSB of the current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the receiving the transmission configuration information through the physical sidelink channel includes: receiving the transmission configuration information transmitted periodically on the physical sidelink control channel, after receiving the transmission configuration information on the physical sidelink broadcast channel.

Optionally, the transmission configuration information is obtained by the user equipment from the slot format indication information in a case that the base station configures all slots as flexible slots.

Optionally, the transmission configuration information is obtained from a single cell-specific time division duplex uplink-downlink pattern configured by the base station.

Optionally, the receiving the transmission configuration information through the physical sidelink channel includes: receiving, in a case that sidelink communication is performed on multiple carriers, the same transmission configuration information for the multiple carriers that is transmitted through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

It should be noted that the information receiving method cooperates with the information transmitting method described above, to achieve the purpose of avoiding transmitting sidelink data on the downlink slot or symbol, and the implementation of the embodiment of the information transmitting method described above is applicable to the method and achieves the same technical effect.

As shown in FIG. 9, an embodiment of the present disclosure further provides user equipment, including a transceiver 920, a memory 940, a processor 910 and a computer program stored in the memory 940 and configured to executed by the processor 910;

the transceiver 920 is configured to transmit transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the transceiver 920 is further configured to carry the transmission configuration information in a payload of the physical sidelink broadcast channel or a demodulation reference signal of the physical sidelink broadcast channel.

Optionally, the physical sidelink channel includes at least a physical sidelink shared channel; the transceiver 920 is further configured to carry the transmission configuration information in a system message block or a radio resource control signalling of the physical sidelink shared channel.

Optionally, the physical sidelink channel includes at least a physical sidelink control channel; the transceiver 920 is further configured to carry the transmission configuration information in sidelink control information of the physical sidelink control channel.

Optionally, the first indication information is:
the time division duplex uplink-downlink pattern information used for communication between a base station and user equipment; or
the slot format indication information used for communication between the base station and the user equipment; or
at least one of uplink slot related information, uplink symbol related information, flexible slot related information or flexible symbol related information in the time division duplex uplink-downlink pattern information used for communication between the base station and the user equipment; or
at least one of uplink slot related information, uplink symbol related information, flexible slot related information or flexible symbol related information in the slot format indication information used for communication between the base station and the user equipment; or the valid information after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:
the next slot of a synchronization slot where the current sidelink synchronization signal and broadcast signal block (S-SSB) is located; or
the first slot of the radio frame including the synchronization slot where the current S-SSB is located; or
the first slot of a radio frame including the synchronization slot where the first S-SSB of the current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the transceiver 920 is further configured to periodically transmitting the transmission configuration information on the physical sidelink control channel after transmitting the transmission configuration information on the physical sidelink broadcast channel.

Optionally, the transmission configuration information is obtained by the user equipment from the slot format indication in a case that the base station configures all slots as flexible slots.

Optionally, the transmission configuration information is obtained from a single cell-specific time division duplex uplink-downlink pattern configured by the base station.

Optionally, the receiving the transmission configuration information through the physical sidelink channel includes: receiving, in a case that sidelink communication is performed on multiple carriers, the same transmission configuration information for the multiple carriers that is transmitted through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

As shown in FIG. 9, in the bus architecture (represented by a bus), the bus may include any number of interconnected buses and bridges, specifically various circuits such as one or more processors represented by the processor 910 and the memory represented by the memory 940 are connected together. The bus may also connect various other circuits such as peripheral devices, voltage regulators, power management circuits, etc., which are all known in the field, and therefore, will not be further described herein. The bus interface 930 provides an interface between the bus and the transceiver 920. The transceiver 920 may be one element or multiple elements, that is, including a plurality of receivers and transmitters, and provide units for communicating with various other devices on the transmission medium. For example, transceiver 920 receives external data from other devices. Transceiver 920 is used to transmit data processed by processor 910 to other devices. Depending on the nature of the computing system, a user interface 950 may also be provided, such as a keypad, a display, a speaker, a microphone, a joystick.

The processor 910 is responsible for managing the bus and general processing, such as running the general purpose operating system as previously described. The memory 940 may be configured to store data used by the processor 910 when performing operations.

Optionally, the processor 910 may be a central processing unit (CPU), an ASIC, an FPGA, or a complex programmable logic device (CPLD).

The user equipment of the embodiment of the present disclosure transmits the transmission configuration information it has learned through at least one channel of PSBCH, PSSCH or PSCCH, so that the user equipment at the opposite end of the sidelink receives the transmission configuration information, thus if the user equipment at the opposite end is not in the coverage area of the base station, it is also able to be informed of the transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

For the user equipment in the embodiment of the present disclosure, since the user equipment solves the problem in a similar principle to the information transmitting method in the embodiments of the present disclosure, the implementation of the user equipment can be referred to the implementation of the method, which will not be repeated here.

Figure 10:
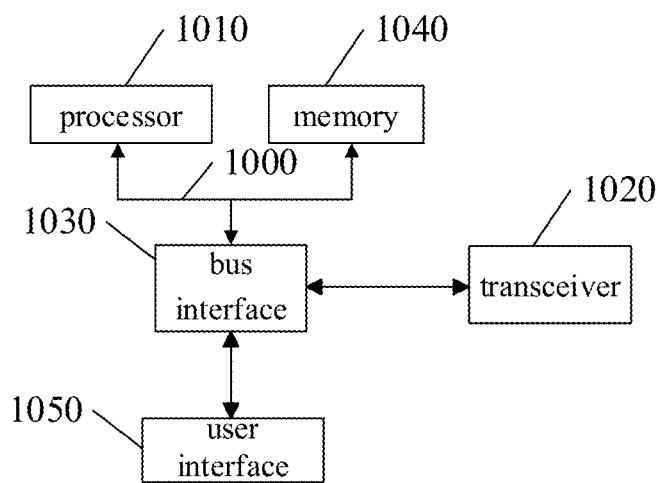
FIG. 10 is a schematic structural diagram of user equipment according to another embodiment of the present disclosure.

As shown in FIG. 10, an embodiment of the present disclosure further provides user equipment, including a transceiver 1020, a memory 1040, a processor 1010 and a computer program stored in the memory 1040 and configured to be executed by processor 1010;
the transceiver 1020 is configured to receive transmission configuration information through a physical sidelink channel; wherein
the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;
the physical sidelink channel includes at least one of a physical sidelink broadcast channel, a physical sidelink shared channel or a physical sidelink control channel.

The first indication information is a transmission format pattern of at least one slot or symbol; or the identifier corresponding to the transmission format pattern of at least one slot or symbol.

Optionally, the physical sidelink channel includes at least a physical sidelink broadcast channel; the transceiver 1020 is further configured to receive the transmission configuration information carried in a payload of the physical sidelink broadcast channel or a demodulation reference signal of the physical sidelink broadcast channel.

Optionally, the physical sidelink channel includes at least a physical sidelink shared channel; the transceiver 1020 is further configured to receive the transmission configuration information carried in a system message block or a radio resource control signalling of the physical sidelink shared channel.

Optionally, the physical sidelink channel includes at least a physical sidelink control channel; the transceiver 1020 is further configured to receive the transmission configuration information carried in sidelink control information of the physical sidelink control channel.

Optionally, the first indication information is:
the time division duplex uplink-downlink pattern information used for communication between a base station and user equipment; or
the slot format indication information used for communication between the base station and the user equipment; or
at least one of uplink slot related information, uplink symbol related information, flexible slot related information or flexible symbol related information in the time division duplex uplink-downlink pattern information used for communication between the base station and the user equipment; or
at least one of uplink slot related information, uplink symbol related information, flexible slot related information or flexible symbol related information in the slot format indication information used for communication between the base station and the user equipment; or
the valid information after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:
the next slot of a synchronization slot where the current sidelink synchronization signal and broadcast signal block (S-SSB) is located; or
the first slot of the radio frame including the synchronization slot where the current S-SSB is located; or
the first slot of the radio frame including the synchronization slot where the first S-SSB of the current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the transceiver 1020 is further configured to receive the transmission configuration information transmitted periodically on the physical sidelink control channel after receiving the transmission configuration information on the physical sidelink broadcast channel.

Optionally, the transmission configuration information is obtained by the user equipment from the slot format indication information in a case that the base station configures all slots as flexible slots.

Optionally, the transmission configuration information is obtained from a single cell-specific time division duplex uplink-downlink pattern configured by the base station.

Optionally, the transceiver is further configured to receive, in a case that sidelink communication is performed on multiple carriers, the same transmission configuration information for the multiple carriers that is transmitted through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

The transceiver 1020 is configured to receive and transmit data under the control of processor 1010.

As shown in FIG. 10, in the bus architecture (represented by a bus 1000), the bus 1000 may include any number of interconnected buses and bridges, and the bus 1000 connects together various circuits such as one or more processors represented by the processor 1010 and the memory represented by the memory 1040. The bus 1000 may also connect various other circuits such as peripheral devices, voltage regulators, power management circuits, etc., which are all known in the field, and therefore, will not be further described herein. The bus interface 1030 provides an interface between the bus 1000 and the transceiver 1020. The transceiver 1020 may be one element or multiple elements, that is, including a plurality of receivers and transmitters, and provide units for communicating with various other devices on the transmission medium. For example, transceiver 1020 receives external data from other devices. Transceiver 1020 is used to transmit data processed by processor 1010 to other devices. Depending on the nature of the computing system, a user interface 1050 may also be provided, such as a keypad, a display, a speaker, a microphone, a joystick.

The processor 1010 is responsible for managing the bus 1000 and general processing, such as running the general purpose operating system as previously described. The memory 1040 may be configured to store data used by the processor 1010 when performing operations.

Optionally, the processor 1010 may be a CPU, an ASIC, an FPGA, or a CPLD.

The user equipment of the embodiment of the present disclosure receives the transmission configuration information transmitted by the user equipment at the opposite end through at least one channel of PSBCH, PSSCH or PSCCH, thus if the user equipment is not in the coverage area of the base station, it is also able to be informed of the transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

The user equipment can perform the embodiments of the method as described above. The implementation principle and the technical effect of the user equipment are similar to the method, which will not be repeated here.

Figure 11:
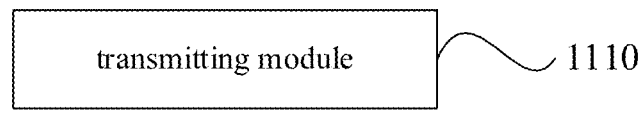
FIG. 11 is a schematic structural diagram of an information transmitting apparatus according to an embodiment of the present disclosure.

As shown in FIG. 11, an embodiment of the present disclosure further provides an information transmitting apparatus, applied to user equipment, including:

a transmitting module 1110, configured to transmit transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the transceiver is further configured to: carry the transmission configuration information in a payload of the physical sidelink broadcast channel or a demodulation reference signal of the physical sidelink broadcast channel.

Optionally, the physical sidelink channel includes at least a physical sidelink shared channel; the transceiver is further configured to: carry the transmission configuration information in a system message block or a radio resource control signalling of the physical sidelink shared channel.

Optionally, the physical sidelink channel includes at least a physical sidelink control channel; the transceiver is further configured to: carry the transmission configuration information in sidelink control information of the physical sidelink control channel.

Optionally, the first indication information is:

the time division duplex uplink-downlink pattern information used for communication between a base station and user equipment; or the slot format indication information used for communication between the base station and the user equipment; or at least one of uplink slot related information, uplink symbol related information, flexible slot related information or flexible symbol related information in the time division duplex uplink-downlink pattern information used for communication between the base station and the user equipment; or at least one of uplink slot related information, uplink symbol related information, flexible slot related information or flexible symbol related information in the slot format indication information used for communication between the base station and the user equipment; or the valid information after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:

the next slot of a synchronization slot where the current sidelink synchronization signal and broadcast signal block (S-SSB) is located; or the first slot of the radio frame including the synchronization slot where the current S-SSB is located; or the first slot of a radio frame including the synchronization slot where the first S-SSB of the current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

Optionally, the transmitting module is further configured to: periodically transmit the transmission configuration information on the physical sidelink control channel, after transmitting the transmission configuration information on the physical sidelink broadcast channel.

Optionally, the transmission configuration information is obtained by the user equipment from the slot format indication in a case that the base station configures all slots as flexible slots.

Optionally, the transmission configuration information is obtained from a single cell-specific time division duplex uplink-downlink pattern configured by the base station.

Optionally, the transmitting module is further configured to: transmit, in a case that sidelink communication is performed on multiple carriers, the same transmission configuration information for the multiple carriers through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

The apparatus transmits the transmission configuration information it has learned through at least one channel of PSBCH, PSSCH or PSCCH, so that the user equipment at the opposite end of the sidelink receives the transmission configuration information, thus if the user equipment at the opposite end is not in the coverage area of the base station, it is also able to be informed of the transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

It is to be noted that the apparatus is an apparatus to which the above-mentioned information transmitting method is applied, and the implementation of the above-mentioned embodiments of the information transmitting method is applicable to the apparatus and is capable of achieving the same technical effect.

Figure 12:
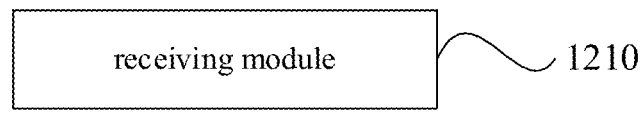
FIG. 12 is a schematic structural diagram of an information receiving apparatus according to an embodiment of the present disclosure.

As shown in FIG. 12, an embodiment of the present disclosure further provides an information receiving apparatus, applied to user equipment, including:

a receiving module 1210, configured to receive transmission configuration information through a physical sidelink channel; wherein the transmission configuration information includes first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel includes at least one of a physical sidelink broadcast channel, a physical sidelink shared channel or a physical sidelink control channel.

Optionally, the first indication information is a transmission format pattern of at least one slot or symbol; or an identifier corresponding to the transmission format pattern of at least one slot or symbol.

Optionally, the physical sidelink channel includes at least a physical sidelink broadcast channel; the receiving module is further configured to: receive the transmission configuration information carried in a payload of the physical sidelink broadcast channel or a demodulation reference signal of the physical sidelink broadcast channel.

Optionally, the physical sidelink channel includes at least a physical sidelink shared channel; the receiving module is further configured to: receive the transmission configuration information carried in a system message block or a radio resource control signalling of the physical sidelink shared channel.

Optionally, the physical sidelink channel includes at least a physical sidelink control channel; the receiving module is further configured to: receive the transmission configuration information carried in sidelink control information of the physical sidelink control channel.

Optionally, the first indication information is:

the time division duplex uplink-downlink pattern information used for communication between a base station and user equipment; or the slot format indication information used for communication between the base station and the user equipment; or at least one of uplink slot related information, uplink symbol related information, flexible slot related information or flexible symbol related information in the time division duplex uplink-downlink pattern information used for communication between the base station and the user equipment; or at least one of uplink slot related information, uplink symbol related information, flexible slot related information or flexible symbol related information in the slot format indication information used for communication between the base station and the user equipment; or the valid information after removing redundant information from the time division duplex uplink-downlink pattern information used for communication between the base station and the user equipment or the slot format indication information used for communication between the base station and the user equipment.

Optionally, the first indication information includes 7 bits of uplink slot indication information.

Optionally, the first indication information further includes 4 bits of uplink symbol indication information.

Optionally, the transmission configuration information further includes second indication information indicating a valid time of the first indication information.

Optionally, the second indication information is:

the next slot of a synchronization slot where the current sidelink synchronization signal and broadcast signal block (S-SSB) is located; or the first slot of the radio frame including the synchronization slot where the current S-SSB is located; or the first slot of a radio frame including the synchronization slot where the first S-SSB of the current synchronization period is located.

Optionally, the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period.

Optionally, the transmission configuration information carried in the sidelink control information is dynamically changing information.

The receiving module is further configured to: receive the transmission configuration information transmitted periodically on the physical sidelink control channel, after receiving the transmission configuration information on the physical sidelink broadcast channel.

Optionally, the transmission configuration information is obtained by the user equipment from the slot format indication in a case that the base station configures all slots as flexible slots.

Optionally, the transmission configuration information is obtained from a single cell-specific time division duplex uplink-downlink pattern configured by the base station.

The receiving module is further configured to: receive, in a case that sidelink communication is performed using multiple carriers, the same transmission configuration information for the multiple carriers transmitted through the physical sidelink channel.

Optionally, the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

The apparatus receives the transmission configuration information transmitted by the user equipment at the opposite end through at least one channel of PSBCH, PSSCH or PSCCH, thus if this user equipment is not in the coverage area of the base station, it is also able to be informed of this transmission configuration information and identify the uplink slot or symbol according to the first indication information therein, avoiding transmitting the sidelink data on the downlink slot or symbol and thus not interfering with the downlink data of the Uu UE, improving the qualities of the sidelink communication and the air interface communication.

It is to be noted that the apparatus is an apparatus to which the above-mentioned information receiving method is applied, and the implementation of the above-mentioned embodiments of the information receiving method is applicable to the apparatus and is capable of achieving the same technical effect.

Another embodiment of the present disclosure further provides a computer readable storage medium with a computer program stored thereon, when executed by a processor, the computer program implements the steps in the information transmitting method applied to user equipment as described above, or, implements the steps in the information receiving method applied to user equipment as described above.

Computer readable storage media includes permanent and non-permanent, removable and non-removable media, and may be implemented by any method or technology for storing information. The information may be computer readable instructions, data structures, modules of a program, or other data. Examples of computer storage media include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic cartridge tape, magnetic tape, magnetic disk storage or other magnetic storage device or any other non-transport medium that can be used to store information accessible by a computing device. As defined herein, computer readable storage media does not include transitory computer readable media, such as modulated data signals and carriers.

It is further noted that the user equipment described in the present disclosure include, but are not limited to, smartphones, tablets, etc., and that many of the functional components described are referred to as modules in order to particularly emphasize the independence of their implementation.

In the embodiments of the present disclosure, the modules may be implemented by software, so as to be executed by various types of processors. For example, an identified executable code module may include one or more physical or logical blocks of computer instructions, for example, it may be built as an object, process, or function. Nevertheless, the executable codes of the identified module do not need to be physically located together, but can include different instructions stored in different locations. When these instructions are logically combined together, they constitute a module and achieve the specified purpose of the module.

In fact, the executable code module can be a single piece of instruction or many pieces of instructions, and even may be distributed on multiple different code segments, distributed in different programs, and distributed across multiple storage devices. Likewise, operational data can be identified within the module, and can be implemented in any suitable form and organized in any suitable type of data structure. The operating data may be collected as a single data set, or may be distributed in different locations (e.g., on different storage devices), and may at least partly exist as an electronic signal in a system or a network.

In the case that a module may be implemented in software, considering the hardware process level in the related art, a person skilled in the art may construct hardware corresponding to all modules that can be implemented in software, to achieve corresponding functions, if cost is not considered. The hardware circuit includes normal very large scale integration (VLSI) circuit or gate array, and semiconductor devices in the relate art such as logic chip or transistor, or other discrete devices. The module may also be implemented with a programmable hardware device, such as field program gate array, programmable logic array or programmable logic device.

The person skilled in the art may realize that the units and algorithm steps described in the embodiments disclosed herein can be implemented by electronic hardware or a combination of computer software and electronic hardware. Whether these functions are executed by hardware or software depends on the specific application and design constraint conditions of the technical solution. The person skilled in the art can use different methods for each specific application to implement the described functions, but such implementation should not be considered as going beyond the scope of the present disclosure.

The person skilled in the art can clearly understand that, for the convenience and conciseness of the description, the specific working process of the system, device, and unit described above can refer to the corresponding process in the foregoing method embodiments, which is not repeated here.

In the embodiments provided in the present disclosure, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or it can be integrated into another system, or some features can be ignored or not implemented. In addition, the displayed or discussed mutual coupling or direct coupling or communication connection may be indirect coupling or communication connection through some interfaces, devices, or units, and may be in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer-readable storage medium. Based on this understanding, the technical solution of the present disclosure essentially or the part that contributes to the related art can be embodied in the form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage media include: U disk, mobile hard disk, ROM, RAM, magnetic disk or optical disk, and other media that can store program codes.

The person skilled in the art can understand that all or part of the processes in the above-mentioned embodiment methods can be implemented by controlling the relevant hardware through a computer program. The program can be stored in a computer-readable storage medium, and the program can be stored in a computer-readable storage medium. When executed, the program may include the procedures of the above-mentioned method embodiments. The storage medium may be a magnetic disk, an optical disc, a read-only memory (ROM), or a random access memory (RAM), etc.

It can be understood that the embodiments described in the present disclosure may be implemented by hardware, software, firmware, middleware, microcode, or a combination of them. For hardware implementation, module, unit, and subunit can be implemented in one or more application-specific integrated circuits (ASIC), digital signal processor (DSP), digital signal processing device (DSP Device, DSPD), programmable logic device (PLD), Field-Programmable Gate Array (FPGA), general-purpose processors, controllers, microcontrollers, microprocessors, and others for performing the functions described in this disclosure electronic unit or the combination thereof.

For a software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above exemplary embodiments are described with reference to the accompanying drawings, and many different forms and embodiments are feasible without departing from the spirit and contents of the present disclosure, and therefore, the present disclosure should not be constructed to be limited by the exemplary embodiments presented herein. More precisely, these exemplary embodiments are provided so that the present disclosure will be complete and will convey the scope of the present disclosure to those skilled in the art. In these drawings, component dimensions and relative dimensions may be exaggerated for the sake of clarity. The terms used herein are for the purpose of describing particular exemplary embodiments and are not intended to be limiting. As used herein, the singular forms "one", "a" and "the" are intended to include those plural forms unless the context clearly indicates otherwise. It is further understood that the terms "comprising" and/or "including", when used in this specification, denote the presence of the features, integers, steps, operations, members and/or components, but do not exclude the presence or addition of one or more other features, integers, steps, operations, members, components and/or components. Unless otherwise indicated, when stated, a range of values encompasses the upper and lower limits of the range and any subrange therebetween. The above are optional implementations of the present disclosure. It should be pointed out that for a person skilled in the art, several improvements and modifications can be made without departing from the principles of the present disclosure. These improvements and modifications should also fall within the scope of the present disclosure.

What is claimed is:

1. An information transmitting method, applied to user equipment, comprising:
   transmitting transmission configuration information through a physical sidelink channel; wherein
   the transmission configuration information comprises first indication information, the first indication information is used for indicating that at least one slot is a downlink slot, a flexible slot or an uplink slot, and/or indicating that at least one symbol is a downlink symbol, a flexible symbol or an uplink symbol;
   the physical sidelink channel comprises at least one of a physical sidelink broadcast channel, a physical sidelink shared channel or a physical sidelink control channel;
   wherein the first indication information comprises 7 bits of uplink slot indication information.

2. The information transmitting method according to claim 1, wherein the first indication information is: a transmission format pattern of at least one slot or symbol; or an identifier corresponding to the transmission format pattern of at least one slot or symbol;
   or,
   wherein the first indication information is:
   time division duplex uplink-downlink pattern information used for communication between a base station and the user equipment; or
   slot format indication information used for communication between the base station and the user equipment; or
   at least one of uplink slot related information, uplink symbol related information, flexible slot related information or flexible symbol related information in the time division duplex uplink-downlink pattern information used for communication between the base station and the user equipment; or
   at least one of uplink slot related information, uplink symbol related information, flexible slot related information or flexible symbol related information in the slot format indication information used for communication between the base station and the user equipment; or
   valid information in the time division duplex uplink-downlink pattern information used for communication between the base station and the user equipment or the slot format indication information used for communication between the base station and the user equipment after removing redundant information from the time division duplex uplink-downlink pattern information used for communication between the base station and the user equipment or the slot format indication information used for communication between the base station and the user equipment.

3. The information transmitting method according to claim 1, wherein the physical sidelink channel comprises at least a physical sidelink broadcast channel;
   the transmitting the transmission configuration information through the physical sidelink channel comprises:
   carrying the transmission configuration information in a payload of the physical sidelink broadcast channel or a demodulation reference signal of the physical sidelink broadcast channel;
   or,
   wherein the physical sidelink channel comprises at least a physical sidelink shared channel;
   the transmitting the transmission configuration information through the physical sidelink channel comprises:
   carrying the transmission configuration information in a system message block or a radio resource control signalling of the physical sidelink shared channel;
   or,
   wherein the physical sidelink channel comprises at least a physical sidelink control channel;
   the transmitting the transmission configuration information through the physical sidelink channel comprises:
   carrying the transmission configuration information in sidelink control information of the physical sidelink control channel.

4. The information transmitting method according to claim 1, wherein the transmission configuration information further comprises second indication information indicating a valid time of the first indication information,
   wherein the second indication information is:
   a next slot of a synchronization slot where a current sidelink synchronization signal and broadcast signal block (S-SSB) is located; or
   a first slot of a radio frame including the synchronization slot where the current S-SSB is located; or a first slot of a radio frame including a synchronization slot where a first S-SSB of a current synchronization period is located.

5. The information transmitting method according to claim 1, wherein the transmission configuration information remains unchanged in one synchronization period; or
in the transmission configuration information, at least one of uplink slot configuration information, uplink symbol configuration information, flexible slot configuration information or flexible symbol configuration information remains unchanged in one synchronization period;
or,
wherein the transmitting the transmission configuration information through the physical sidelink channel comprises:
periodically transmitting the transmission configuration information on the physical sidelink control channel after transmitting the transmission configuration information on the physical sidelink broadcast channel;
or,
wherein the transmission configuration information is obtained by the user equipment from the slot format indication information in a case that a base station configures all slots as flexible slots;
or,
wherein the transmission configuration information is obtained from a single cell-specific time division duplex uplink-downlink pattern configured by a base station;
or,
wherein the transmitting the transmission configuration information through the physical sidelink channel comprises:
transmitting, in a case that sidelink communication is performed using multiple carriers, same transmission configuration information for the multiple carriers through the physical sidelink channel.

6. The information transmitting method according to claim 1, wherein the downlink slot refers to that all symbols in the entire slot are downlink symbols; the flexible slot refers to that all symbols in the entire slot are flexible symbols; the uplink slot refers to that all symbols in the entire slot are uplink symbols; the flexible symbol is a symbol that is not currently configured for uplink or downlink transmission.

7. An information receiving method, applied to user equipment, comprising:
receiving transmission configuration information through a physical sidelink channel;
wherein the transmission configuration information comprises first indication information, the first indication information is used for indicating that at least one slot is a downlink slot, a flexible slot or an uplink slot, and/or indicating that at least one symbol is a downlink symbol, a flexible symbol or an uplink symbol;
the physical sidelink channel comprises at least one of a physical sidelink broadcast channel, a physical sidelink shared channel or a physical sidelink control channel;
wherein the first indication information comprises 7 bits of uplink slot indication information.

8. The information receiving method according to claim 7, wherein the first indication information is: a transmission format pattern of at least one slot or symbol; or an identifier corresponding to the transmission format pattern of at least one slot or symbol;
or,
wherein the first indication information is:
time division duplex uplink-downlink pattern information used for communication between a base station and the user equipment; or
slot format indication information used for communication between the base station and the user equipment; or
at least one of uplink slot related information, uplink symbol related information, flexible slot related information or flexible symbol related information in the time division duplex uplink-downlink pattern information used for communication between the base station and the user equipment; or
at least one of uplink slot related information, uplink symbol related information, flexible slot related information or flexible symbol related information in the slot format indication information used for communication between the base station and the user equipment; or
valid information in the time division duplex uplink-downlink pattern information used for communication between the base station and the user equipment or the slot format indication information used for communication between the base station and the user equipment after removing redundant information from the time division duplex uplink-downlink pattern information used for communication between the base station and the user equipment or the slot format indication information used for communication between the base station and the user equipment.

9. The information receiving method according to claim 7, wherein the physical sidelink channel comprises at least a physical sidelink broadcast channel;
the receiving the transmission configuration information through the physical sidelink channel comprises:
receiving the transmission configuration information carried in a payload of the physical sidelink broadcast channel or a demodulation reference signal of the physical sidelink broadcast channel;
or,
wherein the physical sidelink channel comprises at least a physical sidelink shared channel;
the receiving the transmission configuration information through the physical sidelink channel comprises:
receiving the transmission configuration information carried in a system message block or a radio resource control signalling of the physical sidelink shared channel;
or,
wherein the physical sidelink channel comprises at least a physical sidelink control channel;
the receiving the transmission configuration information through the physical sidelink channel comprises:
receiving the transmission configuration information carried in sidelink control information of the physical sidelink control channel.

10. The information receiving method according to claim 7, wherein the transmission configuration information further comprises second indication information indicating a valid time of the first indication information,
wherein the second indication information is:
a next slot of a synchronization slot where a current sidelink synchronization signal and broadcast signal block (S-SSB) is located; or
a first slot of a radio frame including the synchronization slot where the current S-SSB is located; or a first slot of a radio frame including a synchronization slot where a first S-SSB of a current synchronization period is located.

11. The information receiving method according to claim 7, wherein the transmission configuration information remains unchanged in one synchronization period; or in the transmission configuration information, at least one of uplink slot configuration information, uplink symbol configuration information, flexible slot configuration information or flexible symbol configuration information remains unchanged in one synchronization period;

or, wherein the receiving the transmission configuration information through the physical sidelink channel comprises:

receiving the transmission configuration information transmitted periodically on the physical sidelink control channel after receiving the transmission configuration information on the physical sidelink broadcast channel;

or, wherein the transmission configuration information is obtained by the user equipment from the slot format indication information in a case that a base station configures all slots as flexible slots;

or, wherein the transmission configuration information is obtained from a single cell-specific time division duplex uplink-downlink pattern configured by a base station;

or, wherein the receiving the transmission configuration information through the physical sidelink channel comprises:

receiving, in a case that sidelink communication is performed using multiple carriers, same transmission configuration information for the multiple carriers transmitted through the physical sidelink channel.

12. The information receiving method according to claim 7, wherein the downlink slot refers to that all symbols in the entire slot are downlink symbols; the flexible slot refers to that all symbols in the entire slot are flexible symbols; and the uplink slot refers to that all symbols in the entire slot are uplink symbols; the flexible symbol is a symbol that is not currently configured for uplink or downlink transmission.

13. A user equipment, comprising a transceiver, a memory, a processor and a computer program stored in the memory and configured to be executed by the processor; wherein, the transceiver is configured to transmit transmission configuration information through a physical sidelink channel;

wherein the transmission configuration information comprises first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel comprises at least one of a physical sidelink broadcast channel, a physical sidelink shared channel or a physical sidelink control channel;

wherein the first indication information comprises 7 bits of uplink slot indication information.

14. The user equipment according to claim 13, wherein the physical sidelink channel comprises at least a physical sidelink broadcast channel;

the transceiver is further configured to:

carry the transmission configuration information in a payload of the physical sidelink broadcast channel or a demodulation reference signal of the physical sidelink broadcast channel;

or, wherein the physical sidelink channel comprises at least a physical sidelink shared channel;

the transceiver is further configured to:

carry the transmission configuration information in a system message block or a radio resource control signalling of the physical sidelink shared channel;

or, wherein the physical sidelink channel comprises at least a physical sidelink control channel;

the transceiver is further configured to:

carry the transmission configuration information in sidelink control information of the physical sidelink control channel.

15. The user equipment according to claim 13, wherein the downlink slot refers to that all symbols in the entire slot are downlink symbols; the flexible slot refers to that all symbols in the entire slot are flexible symbols; the uplink slot refers to that all symbols in the entire slot are uplink symbols; the flexible symbol is a symbol that is not currently configured for uplink or downlink transmission.

16. A user equipment, comprising a transceiver, a memory, a processor and a computer program stored in the memory and configured to be executed by the processor; wherein, the transceiver is configured to receive transmission configuration information through a physical sidelink channel;

wherein the transmission configuration information comprises first indication information, the first indication information is used for indicating that at least one slot is a downlink slot, a flexible slot or an uplink slot, and/or indicating that at least one symbol is a downlink symbol, a flexible symbol or an uplink symbol;

the physical sidelink channel comprises at least one of a physical sidelink broadcast channel, a physical sidelink shared channel or a physical sidelink control channel;

wherein the first indication information comprises 7 bits of uplink slot indication information.

17. The user equipment according to claim 16, wherein the physical sidelink channel comprises at least a physical sidelink broadcast channel;

the transceiver is further configured to:

receive the transmission configuration information carried in a payload of the physical sidelink broadcast channel or a demodulation reference signal of the physical sidelink broadcast channel;

or, wherein the physical sidelink channel comprises at least a physical sidelink shared channel;

the transceiver is further configured to:

receive the transmission configuration information carried in a system message block or a radio resource control signalling of the physical sidelink shared channel;

or, wherein the physical sidelink channel comprises at least a physical sidelink control channel;

the transceiver is further configured to:

receive the transmission configuration information carried in sidelink control information of the physical sidelink control channel.

18. The user equipment according to claim 16, wherein the downlink slot refers to that all symbols in the entire slot are downlink symbols; the flexible slot refers to that all symbols in the entire slot are flexible symbols; the uplink slot refers to that all symbols in the entire slot are uplink symbols; the flexible symbol is a symbol that is not currently configured for uplink or downlink transmission.

\* \* \* \* \*